United States Patent
Happel

(10) Patent No.: US 8,231,780 B2
(45) Date of Patent: Jul. 31, 2012

(54) FLOATING SKIMMER AND FILTER APPARATUS

(76) Inventor: Thomas H. Happel, Cocoa, FL (US)

( * ) Notice: Subject to any disclaimer, the term of this patent is extended or adjusted under 35 U.S.C. 154(b) by 288 days.

(21) Appl. No.: 12/800,706

(22) Filed: May 21, 2010

(65) Prior Publication Data

US 2010/0230338 A1 Sep. 16, 2010

Related U.S. Application Data

(63) Continuation-in-part of application No. 12/592,805, filed on Dec. 4, 2009, now Pat. No. 8,083,937, which is a continuation-in-part of application No. 12/587,574, filed on Oct. 13, 2009, now Pat. No. 8,034,234, which is a continuation-in-part of application No. 12/387,583, filed on May 6, 2009, now Pat. No. 8,034,236, which is a continuation-in-part of application No. 12/315,820, filed on Dec. 8, 2008, now Pat. No. 7,846,327.

(60) Provisional application No. 61/009,086, filed on Dec. 27, 2007.

(51) Int. Cl.
*E03F 5/14* (2006.01)

(52) U.S. Cl. ........ 210/122; 210/155; 210/156; 210/162; 210/170.03; 210/305; 210/434; 210/538

(58) Field of Classification Search .................. 210/121, 210/122, 131, 155, 156, 162, 170.03, 242.1, 210/299, 305, 434, 521, 532.1, 538
See application file for complete search history.

(56) References Cited

U.S. PATENT DOCUMENTS

| | | | |
|---|---|---|---|
| 3,395,803 A * | 8/1968 | Sumimoto et al. | 210/122 |
| 5,378,376 A * | 1/1995 | Zenner | 210/122 |
| 6,183,633 B1 * | 2/2001 | Phillips | 210/170.03 |
| 6,478,954 B1 * | 11/2002 | Turner et al. | 210/162 |
| 6,719,912 B2 * | 4/2004 | Seidl | 210/162 |
| 6,869,525 B1 | 3/2005 | Happel | |
| 6,936,163 B2 * | 8/2005 | Use et al. | 210/131 |
| 7,153,417 B2 * | 12/2006 | Happel | 210/162 |
| 7,294,256 B2 | 11/2007 | Happel et al. | |
| 7,846,327 B2 * | 12/2010 | Happel et al. | 210/155 |
| 8,034,234 B2 * | 10/2011 | Happel | 210/162 |
| 8,034,236 B1 * | 10/2011 | Happel | 210/162 |
| 8,083,937 B2 * | 12/2011 | Happel | 210/155 |
| 2011/0168612 A1 * | 7/2011 | Happel | 210/122 |

* cited by examiner

*Primary Examiner* — Christopher Upton
(74) *Attorney, Agent, or Firm* — William M. Hobby, III

(57) ABSTRACT

The present invention is a storm water filter system for filtering floatable debris and non-floating pollutants from storm, water passing through a storm water drain system vault. The storm water filtering system has a vault having chamber having a floating skimmer panel between the inlet thereto and the outlet therefrom. The skimmer panel has a filter passageway therethrough for filtering the storm water while the floatable skimmer panel captures floatable debris and trash from the storm water. Storm water entering the vault inlet passes through a filter element in the skimmer panel and out the vault outlet and also can pass under the floating skimmer panel when the floatable skimmer panel is floated to a raised position to thereby prevent storm water from accumulating on the inlet side of the wall.

12 Claims, 4 Drawing Sheets

US 8,231,780 B2

FLOATING SKIMMER AND FILTER APPARATUS

This patent application is a continuation-in-part application of my U.S. patent application Ser. No. 12/592,805, filed Dec. 4, 2009 for Floating Baffle Panel and Filter Apparatus now U.S. Pat. No. 8,083,937; which is a continuation-in-part of my U.S. patent application Ser. No. 12/587,574 filed Oct. 13, 2009, for Floating Skimmer Apparatus with Up-flow Filter now U.S. Pat. No. 8,034,234; which is Continuation-in-part of my U.S. patent application Ser. No. 12/387,583, filed May 6, 2009 for a Storm Water Filter System Having a Floating Skimmer Apparatus now U.S. Pat. No. 8,034,236; which is a continuation-in-part of my U.S. patent application Ser. No. 12/315,820, filed Dec. 8, 2008 for a Storm Water Filter System Having a Floating Skimmer Apparatus now U.S. Pat. No. 7,846,327; which is based on my U.S. Provisional patent application Ser. No. 61/009,086, filed Dec. 27, 2007 for a Floating Skimmer Apparatus.

BACKGROUND OF THE INVENTION

The present invention is a storm water filter system for blocking floatable debris while filtering non-floating pollutants from storm water passing through a storm water drain system and more specifically, the present invention is directed towards a storm water filtering system having a floatable skimmer panel therein for blocking floatable debris from passing thereby and separately filtering non-floatable pollutants from water passing therethrough. The floatable skimmer panel is able to rise with the rising water level to block floatable debris while allowing water to flow unrestricted therebeneath during large rain events.

Federal clean water requirements require that water bodies such as lakes and rivers meet strict minimal water quality specifications. To achieve this end, storm water drainage pipes often require treatment before conveying storm water into receiving water bodies. As a result, a wide variety of technologies have been developed to treat storm water and improve the water quality.

A common variety of storm water treatment systems are hydrodynamic separators such as baffle boxes and vortex systems. Hydrodynamic separators can treat relatively large water flows and are good for removing solids that are relatively large in size. Hydrodynamic separators do very little to remove the dissolved pollutants and have a typically poor removal efficiency for fine particles.

To achieve water treatment beyond what can be accomplished by a hydrodynamic separator, another class of storm water treatment systems commonly referred to as filtration systems are used. Filtration systems typically will pass the water flow through a filter media such as sand, zeolite, activated carbon, and the like. Filter media is typically selected to do more than remove solids from the water flow. Depending on the pollutants of concern, filter media can be selected to remove specific dissolved pollutants such as nutrients, metals, or a wide variety of chemical contaminates.

However, a problem with using filter media in a storm water treatment system is the significant influence of friction between the water and the media. In addition, changing the direction of water flow as it passes through a filtration system reduces the kinetic energy of the water flow which will reduce the volume water flow. During big rain events a storm water filtration system in a storm water pipe can significantly inhibit the passage of water and cause flooding upstream from the filtration system. If the filtration system becomes clogged with debris the water flow can be completely stopped.

The purpose of the present invention is to be able to treat the storm water flow with a storm water filtration system that is resistant to clogging, yet be able to pass large water flows during large rain events. In this way filter media can be incorporated into the treatment of storm water without the potential of flooding upstream caused by the filtration system.

The present invention can be described as a vault that contains a floating skimmer having a passageway therethrough having a filter with a filter media therein for the passage of water therethrough. During times of high flow rates the floating skimmer rises with the water level in the vault and allows water to flow unrestricted thereunder and under the filter. The skimmer system portion and the filter system of the invention are both positioned in line with the water flow. Once the water flow has passed through the filter or under the floatable filter panel, it will continue down stream. During large rain events that cause the water levels within the vault to rise, the floating skimmer panel rises to allow water to flow thereunder and by-pass the filter.

The invention has three primary components that work in concert with each other. The filter passes the storm water therethrough during normal water level conditions while the floating skimmer panel blocks floatable debris from passing through the vault and acts to direct the water flow through the filter during low to medium flow rates. During large flow rates the floating skimmer panel raises to allow the high flow rates to pass unrestricted therebeneath with minimal friction.

In the present invention a floating skimmer panel is used which has the same performance of a much taller fixed panel without the head loss associated with taller panels by opening up a larger passageway under the panel. A storm water treatment structure that makes use of a floating skimmer panel can be more easily retrofitted to an existing water shed storm drain system due to the minimal head loss of the shorter skimmer.

In my prior U.S. Pat. No. 6,869,525 for a Storm Drain Filter System I show a storm drain filter system which includes a skimmer for collecting floating hydrocarbons and for absorbing the hydrocarbons in a hydrocarbon absorbing boom while preventing them from passing out of the skimmer. In my prior U.S. Pat. No. 7,294,256 for a Storm Water Filter System, a storm water filter system is provided for filtering storm water being fed into an in-ground well and uses a fixed skimmer to prevent floating organic debris from entering the discharge into the in-ground recharge well.

SUMMARY OF THE INVENTION

The present invention is a storm water filter system for filtering floatable debris and non-floating pollutants from storm water passing through a storm water drain system vault. The storm water filtering system has a vault having a chamber having an inlet thereto and an outlet therefrom. A pair of tracks are attached to the vault housing and have a floating skimmer panel riding therein. The skimmer panel has a top and a bottom and a pair of sides and is movably mounted in the pair of tracks and is positioned to block floatable debris from passing thereover while forming a passageway thereunder. The floating skimmer panel has a filter opening therethrough having a filter mounted therein. At least one floatation member is mounted on the floatable skimmer panel to allow the skimmer panel to rise and fall in the pair of tracks with the rise and fall of storm water on the inlet side of the vault chamber from a rest position to a raised position opening or enlarging a passageway therebeneath as the water level rises in the vault chamber. The filter element is removably mounted in the floating skimmer panel opening for filtering storm water passing therethrough. Storm water entering the vault inlet passes through the filter element and out the vault outlet and can also pass under the floating skimmer panel when the floatable skimmer panel is floated to a raised position to thereby prevent stormwater from accumulating on the inlet side of the wall.

The floatable skimmer panel has a pair of seals on the sides thereof aligned to seal the floating skimmer panel against the pair of tracks. The floatable skimmer panel has a plurality of rollers, including load rollers and alignment rollers, on each side thereof riding in each side of the pair of tracks. The filter element may have plural filter media therein including a hydrocarbon absorbing media.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
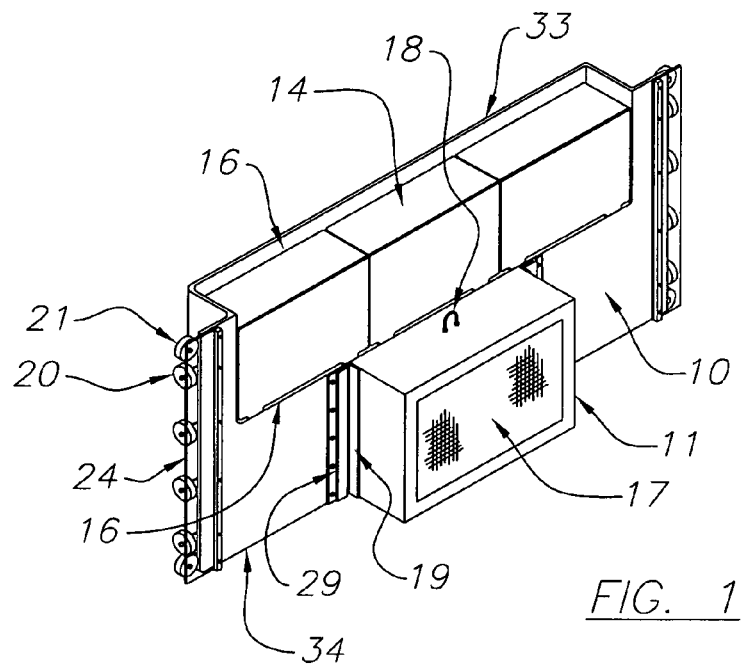
FIG. 1 is a perspective view of the floating skimmer panel inflow side.
Figure 2:
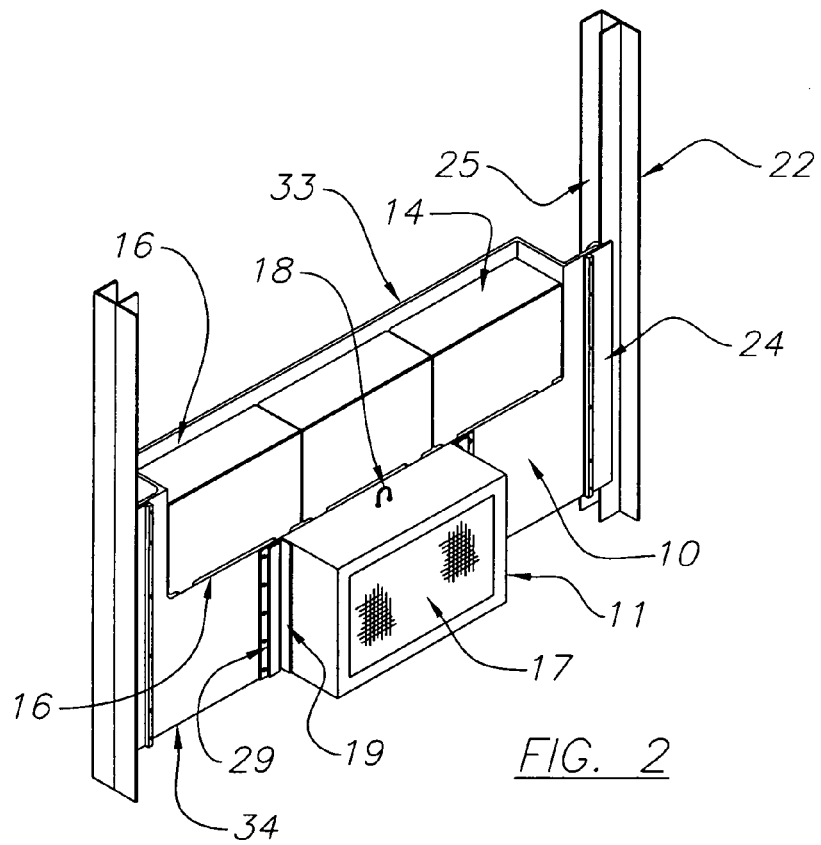
FIG. 2 is a perspective view of the floating skimmer panel of FIG. 1 movably mounted in a pair of tracks.
Figure 3:
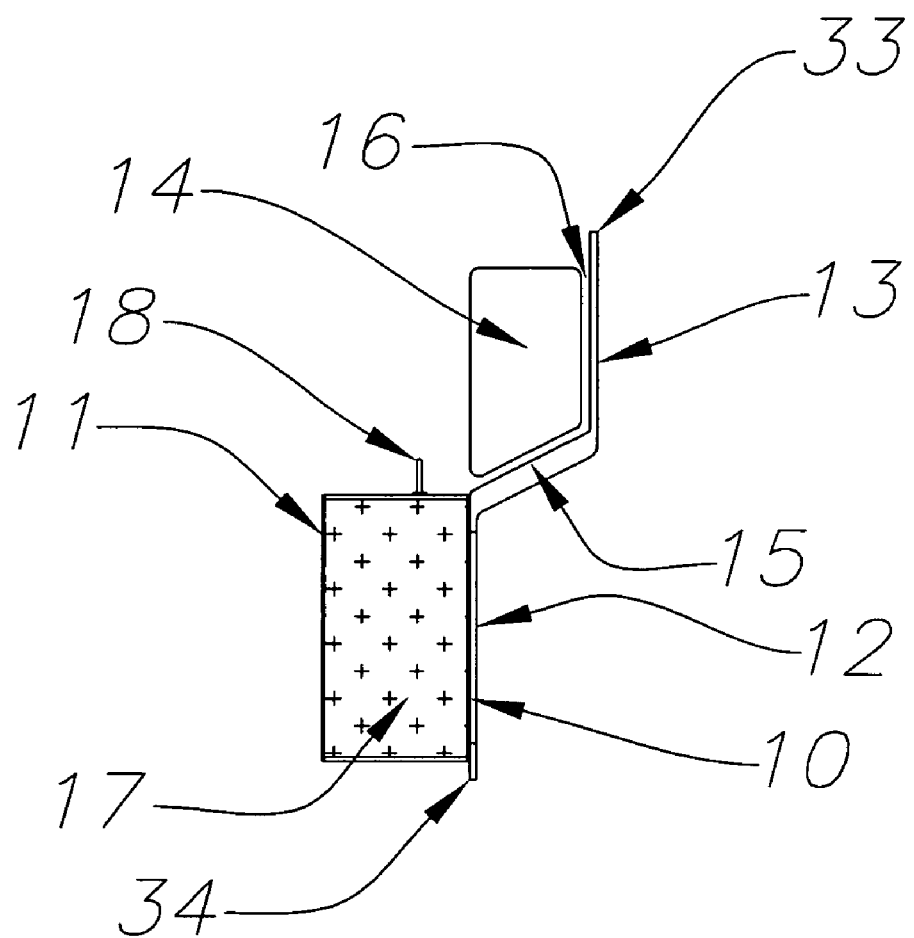
FIG. 3 is a sectional view of a skimmer panel having the filter element attached thereto.

Referring to the drawings, FIGS. 1 through 6, and especially to FIGS. 1 through 3, a skimmer panel 10 has a filter 11, filled with a filter medium 17, removably mounted in an opening 12 in the panel 10. The skimmer panel has a recessed area 13 on the inlet side of the skimmer panel 10 having a plurality of floats 14 supported therein. The recessed area 13 has an angled bottom 15 and has each float 14 mounted therein with a space 16 between each skimmer float and the skimmer panel to thereby allow water behind the floats 14 and to allow debris behind a float to pass therefrom along the angled surface 15. The filter 11 has an eye member which may be engaged for removing and replacing the filter 11 when the filter medium is being replaced.

The skimmer panel 10 has a plurality of load rollers 20 and a plurality of alignment rollers 21 on each side thereof. The rollers 20 and 21 fit within the tracks 22 on either side of the vault 23. The skimmer panel 10 also has seals 24 attached on each side thereof and adjacent the rollers 20 and 21 which seals ride on the sides of the channel tracks 22 to better seal the opening against the passage of storm water therearound to assure that the water goes through the filter 21. The tracks 22 have an elongated groove 25 therein for supporting the rollers 20 and 21 therein. The filter 11 has a pair of side edges 19 sized to fit into a pair of channels 29 on the edge of the filter opening of the skimmer panel 10. This allows the filter to be slip on and off from the skimmer panel 10. A lifting point 18 is provided to enable easy removal of the filter through the access opening 28 in the top of the vault 23 without having to enter the vault.

A wide variety of filter media is readily available in the market place. The selection of the desired filter media is typically determined by targeting treatment with regard to the pollutants of concern. The filter media of the present filter can have multiple filter media and may include a hydrocarbon absorption media.

Figure 4:
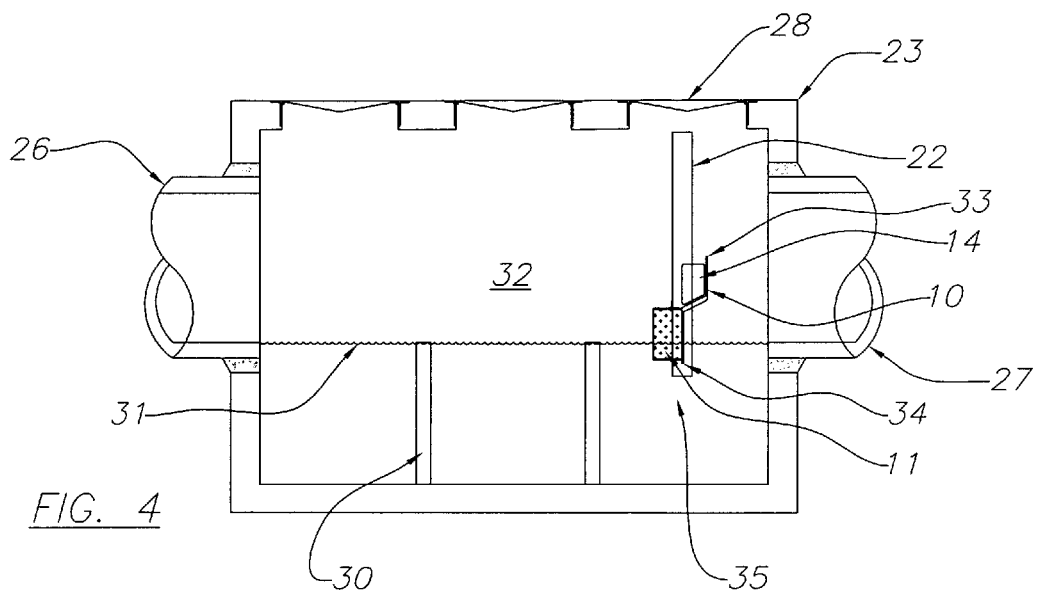
FIG. 4 is a sectional view of a vault having the floatable skimmer panel mounted therein in a no water flow rest position.
Figure 5:
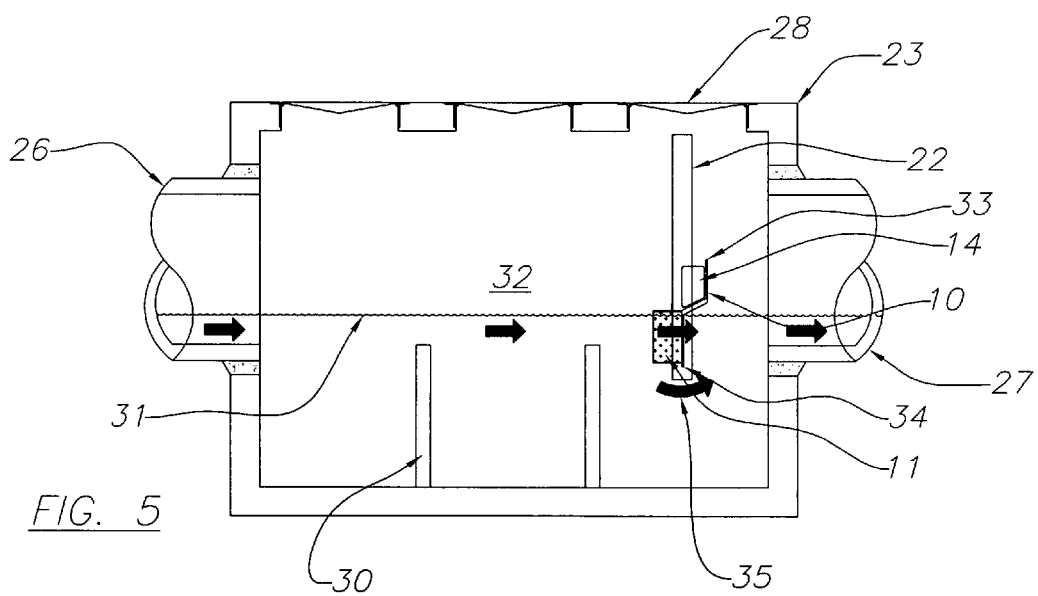
FIG. 5 is a sectional view of the vault of FIG. 4 having the floatable skimmer panel mounted therein raised during low water flow condition.
Figure 6:
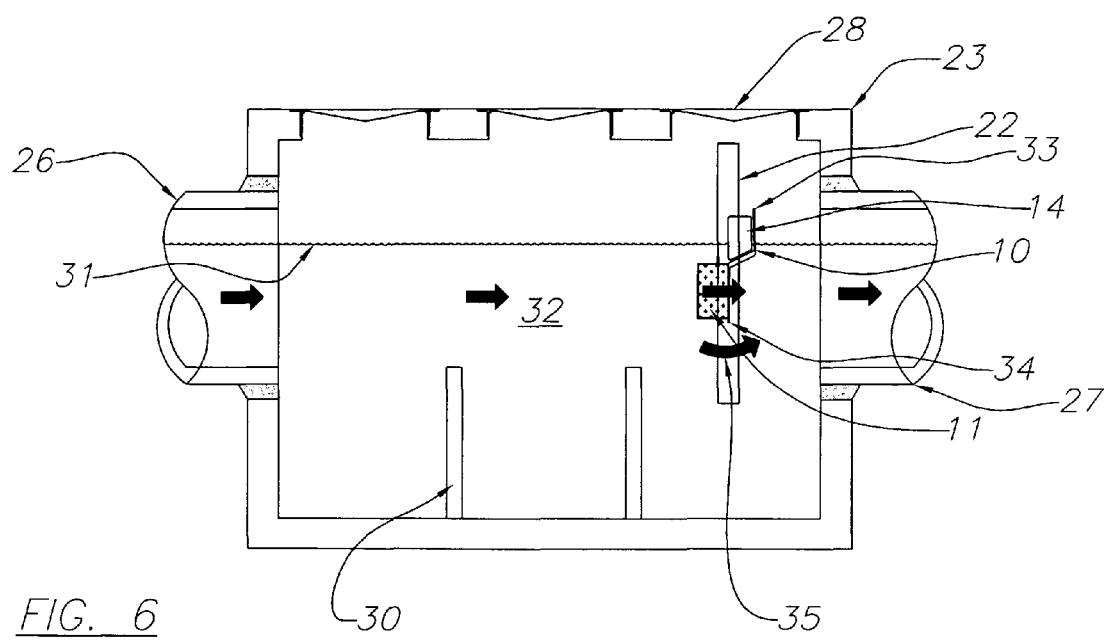
FIG. 6 is a sectional view of the vault of FIGS. 4 and 5 having the floatable skimmer panel mounted therein raised during a high water flow condition.

The operation of filter system can be seen in connection with FIGS. 4 through 6 in which the vault 23 has a "no" water flow illustrated in FIG. 4 and a normal or low water flow condition illustrated in FIG. 5 and a high water flow condition in FIG. 6. In FIG. 4 the skimmer panel 10 is in a rest position having no water entering the inlet 26 of the vault 23 or leaving the outlet 27 of the vault 23. The vault 23 has openings 28 in the top thereof for entering the vault for changing the filter or for cleaning the vault. The vault also has a plurality of baffle elements 30 extending from the bottom of the vault which baffle water passing through the vault and collect sand or other heavy materials from the water passing through the vault 23.

The tracks 22 can be seen attached to the sides of the vault for movably supporting the skimmer panel 10. The skimmer panel 10 rises and falls in the tracks 22 as the water 31 level in the vault rise and fall to always maintain the top 33 of the skimmer panel above the water level to capture floating debris entering the vault 23 to prevent it passing though the outlet 27.

In normal conditions the water entering the vault 23 chamber 32 from the inlet 26 passes the baffles 30 as seen in FIG. 5. The floating skimmer panel 10 blocks any floating debris from entering the vault outlet 27. The water passes through the filter element 11 and out the vault outlet 27. Excess water can also flow under the bottom 34 of the skimmer panel 10 and under the filter element 11 and into the outlet 27 as seen by the arrows in FIG. 5.

FIG. 6 illustrates the flow of storm water through the vault 23 in high water flow conditions. Water entering the vault inlet 26 has raised the level of water in the vault and is being backed up by the restricted flow through the vault 23. The raised water level raises the floatable skimmer panel 10 to block floatable debris from passing thereover and simultaneously continues to pass the water through the filter 11 to remove soluble pollutants from the water. The raised position of the skimmer panel 10 also enlarges the passageway 35 beneath the skimmer panel 10 to allow a much greater flow through the vault 23 and out the outlet 27.

It should be clear at this point that during low to high flow conditions the storm water entering the vault 23 chamber 32 passes through the filter element 11 and also flow under the varying opening 35. The changing opening 35 adjusts for the different flow conditions and prevent the overflow of the skimmer element. As the water rises, the skimmer panel rises to provide an unimpeded flow therebeneath to prevent a backup of the water while still blocking floating debris from passing through the vault. Debris caught in the vault is consumed by micro-organisms between rain events to aid in freeing up and making available the media surface for the next rain event. However, the present invention is not to be limited to the forms shown which are to be considered illustrative rather than restrictive.

I claim:

1. A storm water filter system comprising:
a vault housing having a chamber therein having an inlet thereinto and an outlet therefrom;
a pair of tracks attached to said vault housing; a floating skimmer panel having a top and a bottom and a pair of sides and being movably mounted in said pair of tracks and positioned to block floatable debris from passing thereover while forming a passageway thereunder, said floating skimmer panel having a filter opening therethrough;

at least one floatation member mounted on said floatable skimmer panel to allow said skimmer panel to rise and fall in said pair of tracks with the rise and fall of storm water on the inlet side of said vault housing from a rest position to a raised position enlarging a passageway therebeneath as the water level rises in said vault chamber; and a filter element removably mounted in said floating skimmer panel opening for filtering storm water passing therethrough;

whereby storm water entering said vault inlet passes through said filter element and out said vault outlet and under said floating skimmer panel when said floatable skimmer panel is floated to a raised position to thereby prevent storm water from accumulating on the inlet side of said wall.

2. The storm water filter system of claim 1 in which said filter opening has a pair of tracks on two sides thereof for said filter to slide into and out of for filter replacement.

3. The storm water filter system of claim 2 in which said floatation member is attached to said skimmer panel on the inlet side of thereof.

4. The storm water filter system of claim 3 in which said filter element has a pair of edges sized to fit into said filter opening pair of tracks.

5. The storm water filter system of claim 4 in which said filter opening has a bottom surface having a channel therein for a filter bottom edge to fit into.

6. The storm water filter system of claim 5 in which said floatable skimmer panel has a pair of seals on each side thereof aligned for sealing the floating skimmer panel against said pair of tracks.

7. The storm water filter system of claim 6 in which said filter element has a lift member for engaging to lift said filter element from said floating skimmer panel filter opening.

8. The storm water filter system of claim 7 in which said floatable skimmer panel has a plurality of rollers on each side thereof riding in each side of said pair of tracks.

9. The storm water filter system of claim 8 in which said plurality of rollers on each side of said floatable skimmer panel includes a plurality of load rollers supporting said moving skimmer panel against the force of water bearing thereagainst.

10. The storm water filter system of claim 9 in which said plurality of rollers includes a pair of centering rollers on each side of said floatable baffle panel.

11. The storm water filter system of claim 10 having each said baffle panel track is a vertically extending channel holding said rollers therein.

12. The storm water filter system of claim 11 in which said filter element has hydrocarbon absorption filtering media therein.

* * * * *